US011255971B2

(12) United States Patent
Bechadergue et al.

(10) Patent No.: US 11,255,971 B2
(45) Date of Patent: Feb. 22, 2022

(54) OPTICAL TELEMETRY SYSTEM

(71) Applicants: Institut Vedecom, Versailles (FR); Universite Versailles Saint-Quentin-En-Yvelines, Versailles (FR)

(72) Inventors: Bastien Bechadergue, Malakoff (FR); Luc Chassagne, Montrouge (FR); Hongyu Guan, Bievres (FR)

(73) Assignees: INSTITUT VEDECOM, Versailles (FR); UNIVERSITE VERSAILLES SAINT-QUENTIN-EN-YVELINES, Versailles (FR)

( * ) Notice: Subject to any disclaimer, the term of this patent is extended or adjusted under 35 U.S.C. 154(b) by 652 days.

(21) Appl. No.: 16/302,524

(22) PCT Filed: May 10, 2017

(86) PCT No.: PCT/FR2017/051110

§ 371 (c)(1),
(2) Date: Nov. 16, 2018

(87) PCT Pub. No.: WO2017/198927

PCT Pub. Date: Nov. 23, 2017

(65) Prior Publication Data

US 2019/0204444 A1 Jul. 4, 2019

(30) Foreign Application Priority Data

May 19, 2016 (FR) ....................................... 1654486

(51) Int. Cl.

| | |
|---|---|
| ***G01S 17/74*** | (2006.01) |
| ***G01S 7/00*** | (2006.01) |
| ***G01S 17/931*** | (2020.01) |

(52) U.S. Cl.
CPC .............. *G01S 17/74* (2013.01); *G01S 7/006* (2013.01); *G01S 17/931* (2020.01)

(58) Field of Classification Search
None
See application file for complete search history.

(56) References Cited

U.S. PATENT DOCUMENTS 7,751,726 B1 7/2010 Gazzola et al.
9,562,972 B2 2/2017 Pollmer
(Continued)

FOREIGN PATENT DOCUMENTS

CN 112152646 A * 12/2020 ........... G01S 13/345
DE 102018102979 A1 * 8/2019 ........... H04B 1/0067
(Continued)

OTHER PUBLICATIONS

International Search Report corresponding to PCT/FR2017/051110 dated Aug. 7, 2017.

(Continued)

*Primary Examiner* — Hovhannes Baghdasaryan
(74) *Attorney, Agent, or Firm* — Sandberg Phoenix & von Gontard

(57) ABSTRACT

The present invention relates to an optical telemetry system for measuring the distance between two vehicles comprising a first optoelectronic assembly formed by at least one light source $SL_s$ and at least one photosensitive sensor CP+, which source and sensor are oriented towards in front of the vehicle, and a second optoelectronic assembly formed by at least one light source $SL_c$ (6) and at least one photosensitive sensor $CP_c$ (5) that is oriented towards behind the vehicle, characterized in that said light sources $SL_s$ and $SL_c$ are conventional light sources, the light source $SL_s$ being modulated by a signal of frequency $F_s$, said light source $SL_c$ (6) of the target (4) being modulated by a clock of frequency (Continued)

controlled by a phase-locked loop driven by the electrical signal delivered by said photosensitive sensor $CP_c$, said first optoelectronic assembly furthermore comprising a circuit for measuring the phase shift between the electrical signal delivered by said photosensitive sensor $CP_s$ (5) and the signal modulating the paired light source $SL_s$ (6), said system furthermore comprising a computer for determining the distance depending on the frequency $F_s$ and the measured phase shift. The invention also relates to an optoelectronic assembly for an optical telemetry system, to a vehicle equipped with such a system and to a telemetry method.

21 Claims, 2 Drawing Sheets

(56) References Cited

U.S. PATENT DOCUMENTS

2009/0072996 A1 3/2009 Schoepp
2016/0363659 A1* 12/2016 Mindell .................. G01S 13/74

FOREIGN PATENT DOCUMENTS

EP 0300663 A2 1/1989
EP 0629067 A1 12/1994
EP 0961134 A1 12/1999
EP 2962127 B1 1/2016
JP 2014-16809 A 1/2014

OTHER PUBLICATIONS

Written Opinion corresponding to PCT/FR2017/051110 dated Aug. 7, 2017.
Masatoshi Uchida et al: "A vehicle-to-vehicle communication and ranging system based on spread spectrum technique-SS communication radar", 1994 Vehicle Navigation and Information Systems Conference Proceedings; Aug. 31-Sep. 2, 1994, Yokohama, Japan; pp. 169-174; 1994 New York, NY USA IEEE.
Kiyoshi Mizui et al.: "Vehicle-toVehicle Communications and Ranginjg System Using Spread Spectrum Techniques"; Electronics and Communications in Japan, Part 1, vol. 79, No. 12, 1996; Dec. 1, 1996, pp. 106-115; Communications, Wiley, Hoboken NJ, US, XP000679210.
Akira John Suzuki et al.: "Laser Radar and Visible Light in a Bidirectional V2V Communication and Ranging System", 2015 IEEE International Conference on Vehicular Electronics and Safety (ICVES), IEEE; Nov. 5, 2015, pp. 19-24; DOI: 10.1109/ICVES.2015.7396887.

* cited by examiner

OPTICAL TELEMETRY SYSTEM

CROSS-REFERENCE TO RELATED APPLICATIONS

This application is the US National Stage under 35 USC § 371 of International App. No. PCT/FR2017/051110 filed May 10, 2017, which claims priority to French application 1654486 filed on 19 May 2016, the contents of which (text, drawings and claims) are incorporated herein by reference.

BACKGROUND

Field of the Invention

The present invention concerns the field of optical telemetry, for estimating distance between a few tens of centimeters and a few tens of meters, and more particularly a system for measuring the distance between two moving objects such as robots or motor vehicles that follow one another.

This system could complement the FMCW radar technologies that are already deployed (but sensitive to interference) or LIDAR (still little deployed because they are relatively expensive) for short-distance and heavy traffic applications such as grouping vehicles into platoons of road convoys (known as platooning).

However, the principle can be extended to fields of application other than motor vehicles, for example for traveling carriages used in a factory or for industrial robots.

State of the Art

Numerous telemetry solutions are known in the state of the art, based on the use of sound or ultrasound waves, electromagnetic, radio frequency or light waves.

In the latter category, telemeters that implement a laser source are known.

Two distance measurement techniques are generally used in motor vehicles:

Coherent detection.

Direct detection by time-of-flight measurement.

The coherent detection method is used in FMCW (Frequency Modulation Continuous-Wave) radar systems, the principle of which is as follows: a signal with a sawtooth modulated frequency is transmitted by the system. This signal is then reflected by the target whose distance from the system we wish to measure. The echo received by the system has undergone a frequency offset proportional to the system/target distance. This type of radar uses coherent radio waves.

Direct detection by time-of-flight measurement is used in Radar Ultra-Wide Band (UWB) type systems, where the carrier wave is a radio wave, and in LIDAR, where the carrier wave is a light wave, usually monochromatic, infrared and coherent. It can also be used with (ultra)sound waves (for the reversing sensors, for example). Two methods are used for time-of-flight measurement:

- direct time-of-flight measurement, the principle of which is simple: when the wave is emitted by the system, a counter is triggered. When the echo reflected by the target is received, this counter is stopped. The time thus measured corresponds to the return time of the wave emitted and is therefore proportional to the system/target distance;
- indirect measurement by phase shift measurement, the principle of which is similar: a periodic signal is emitted at a fixed frequency. The echo reflected by the target is received by the system with a phase shift that is directly proportional to the system/target distance.

A particular example of the carrier wave being an optical wave is disclosed in EP2962127, which concerns a method for determining a distance of an object from a motor vehicle by using a PMD sensor, comprising the following steps:—in a measurement cycle, measuring a phase shift of a measurement signal reflected by the object for at least one modulation frequency,

- the modulation frequency being chosen so as to enable, on the basis of this phase shift, an unequivocal determination of a distance within a coverage range starting at the motor vehicle, and measuring the propagation time of an individual signal reflected by the object during an interval of time that starts with the emission of the individual signal and ends at a point in time corresponding to twice the path of the coverage range,
- if a reflected individual signal has been measured during the interval of time, determining a distance on the basis of the phase shift;
- if no reflected individual signal has been measured during the interval of time, rejecting the phase shift without determining the distance.

EP0300663 describes another example of optical telemetry implementing a light source modulated by continuous amplitude modulation, a sensor to pick up part of the optical energy sent back by an object, and means for measuring the distance to the object by detecting the phase difference between the modulation of the optical energy radiated and the modulation of the optical energy sent back, comprising a means to compensate for the variation in the level of optical energy sent back.

Also known, in a context that does not involve measuring the distance between two moving vehicles but measuring with high precision the determination of the position of a moving object in relation to a fixed terminal, is a method described in EP0961134.

EP0961134 describes an automated roadway system comprising transponders or data stations spaced apart in known positions along the roadway. This roadway system allows a vehicle to determine its position as it travels along the roadway. Each vehicle is equipped with a transmitter transmitting a spread-spectrum emission signal that is pseudo (PN) coded. The signal emitted is received by the transponder of a terminal arranged at the edge of the roadway. This transponder emits a response signal to a receptor on board a vehicle. The receiver also receives a second signal that can be a response signal coming from the same transponder or a response signal coming from an adjacent transponder. The system then measures a time difference between the transmission of the original interrogation signal of the vehicle and the receipt of its corresponding response signal in order to determine the distance between the vehicle and the transponder or the reflector. On the basis of the distances determined, the positions of the transponders and the distance traveled by the vehicle during its communications, the position of a vehicle is determined by using triangulation methods.

Also known are publications by UCHIDA et al. "A vehicle-to-vehicle communication and ranging system based on spread-spectrum technique-SS communication radar" released at the "Vehicle navigation and information systems conference proceedings 1994, Yokohama Japan, 31 Aug. 1994, ISBN 978-to-7803-2105-2" or MIZUI et al. "A vehicle-to-vehicle communication and ranging system based on spread-spectrum technique" ISSN 8756-6621 or SUZUKI et al. "Laser radar and visible light in a bidirectional V2V communication and ranging system" 2015 IEEE ICVES XP032866885. These articles propose solutions based on laser beams emitting a monochromatic and coherent light in order to measure the distance between two vehicles.

Drawbacks of the Prior Art

The solutions of the prior art compulsorily require the use of coherent and directive light sources, in order to prevent external disturbances. The reflected signal is, with such sources, certainly noisy but sufficiently powerful and "clean" to ensure the measurement of distance over several tens of meters.

However, these sources are expensive and require the addition of an additional optical component with respect to the standard equipment of a car, for example a laser source or additional LED built into the vehicle.

The solutions of the prior art do not allow sources that are already built into a vehicle to be used for other purposes, for example the front and rear lights. In fact, these sources are polychromatic, incoherent and dispersive, and cause a problem of attenuation of the signal after reflection.

Another drawback of the solutions of the prior art is that they are sensitive to the interferences generated by similar adjacent systems. If system X sends a signal and receives the signal of system Y rather than the desired echo, the measurement will be false. This is why PN codes are used. This solution certainly prevents collisions between the signals emitted by two vehicles in the same detection zone of a terminal, but requires the individualization of the code equipping each vehicle. For a string length of given PN signals, the number of codes available is limited and so allows only a limited number of vehicles to be equipped with a unique code. The increase in the length of the string certainly allows the number of vehicles that can be equipped to be increased but then involves heavy and slow data processing operations in order to calculate autocorrelation.

Moreover, such a solution requires a coherent and monochromatic light signal to prevent disturbances by parasitic light and is not suitable for sending incoherent white or colored light signals.

SUMMARY

In order to overcome these drawbacks, the invention concerns in its broadest sense an optical telemetry system according to claim 1 and the dependent claims.

In the context of the present patent, a "conventional light source" means an electric light source that is not a laser beam. The conventional light sources implemented by the invention are not simultaneously monochrome, directive and coherent. Specifically in the context of the present invention, a "conventional light source" constitutes a white or colored electroluminescent diode, an LED array or assembly, or an electric filament lamp, or even a vehicle lamp or signaling light.

The invention also concerns a telemetry method according to the claims.

DESCRIPTION OF THE FIGURES

A better understanding of the present invention will emerge from the following detailed description of a non-limiting example, with reference to the accompanying drawings, in which.

DETAILED DESCRIPTION

Figure 1:
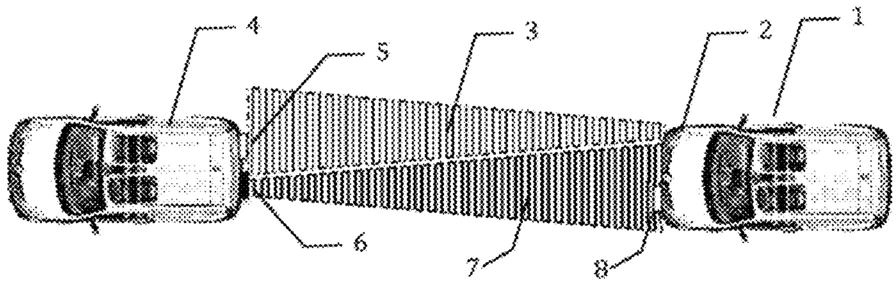
FIG. 1 represents a schematic view of an optical telemetry system.
Figure 2:
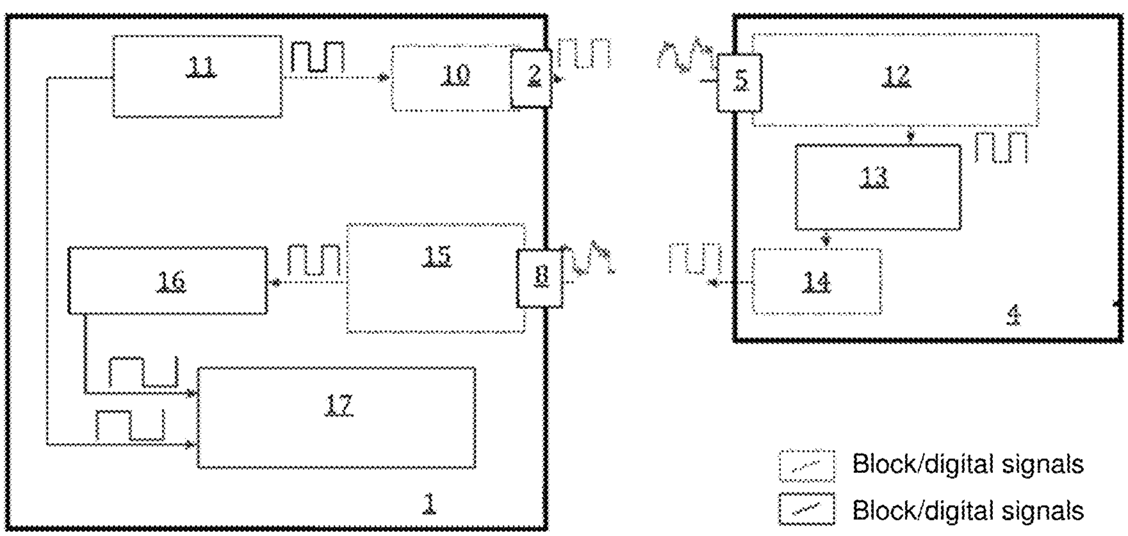
FIG. 2 represents the functional diagram of the optoelectronic assemblies.

General principle of the invention FIG. 1 represents a schematic view of an optical telemetry system. The following vehicle (1) is equipped with a lamp with light emitting diodes (2) emitting a beam (3) in the direction of a followed vehicle (4).

The followed vehicle is equipped with a sensor (5) and a light emitting diode light source (6) emitting a beam (7) in the direction of the following vehicle (1), which is equipped with a sensor (8).

In a first example, the first optoelectronic assembly is formed by a single light source $SL_s$ and one photosensitive sensor $CP_s$, both oriented towards the front of the vehicle. The second optoelectronic assembly is formed by one light source $SL_c$ (6) and one photosensitive sensor $CP_c$ (5) oriented towards the rear of the vehicle.

The term "a single conventional source" can refer to an LED, for example, or to an array of LEDs forming a headlamp or signaling light.

Functional Diagram of the Optoelectronic Assemblies

The following vehicle (1) is equipped with an optoelectronic assembly comprising an LED light source (2) powered by a driver circuit (10). This driver circuit (10) is controlled by a square-wave signal generator (11) delivering a modulation signal at a frequency of 1 MHz, in the example described. This modulation frequency is preferably between 0.5 and 10 MHz.

The light signal transmitted, when it is received by the sensor (5) of the followed vehicle or target (4), is attenuated and noisy.

The sensor (5) of the followed vehicle or target (4) delivers a noisy electrical signal to a processing circuit (12) comprising a step of amplifying and a step of filtering the signal received, then a step of comparison in order to reconstruct the square-wave signal emitted. This square-wave signal is transmitted to a phase-locked loop (PLL) making it possible to control an oscillator (13), the phase of which is identical to that of the reconstructed signal. The frequency of this oscillator (13) is identical to that of the oscillator (11), or a multiple or sub-multiple of this frequency.

This processing makes it possible to restore a signal having a shape factor close to that of the signal emitted by the light source (2) of the following vehicle, and to eliminate the noise caused by the parasitic light coming from road lighting, ambient light or various reflections that can illuminate the sensor of the followed vehicle.

The re-emitted signal (14, 6) is received by the sensor (8) of the following vehicle (1) then processed by a circuit (15) in order to be reconstructed as a square-wave signal. This reconstructed signal is then transposed at a lower intermediate frequency by a heterodyne mixer circuit (16).

The output of the circuit (16) is used as the input of a microcomputer (17) controlled by an algorithm for measuring the phase shift. The signal emitted in the first place is also transposed to the intermediate frequency in order to be compared, during the phase shift measurement, to the signal received by the following vehicle and heterodyned.

Unlike FMCW or LIDAR/ultrasound-detector radars, the disclosed system describes by way of non-limiting example the use of white light produced by the LED lamps of vehicles, or colored light in the case of light produced by other signaling lamps.

This light is polychromatic and incoherent. Consequently, the wave reflected by the target will be much more attenuated than in the case of a coherent wave, making it impossible for the system to work directly with the reflected wave.

Figure 3:
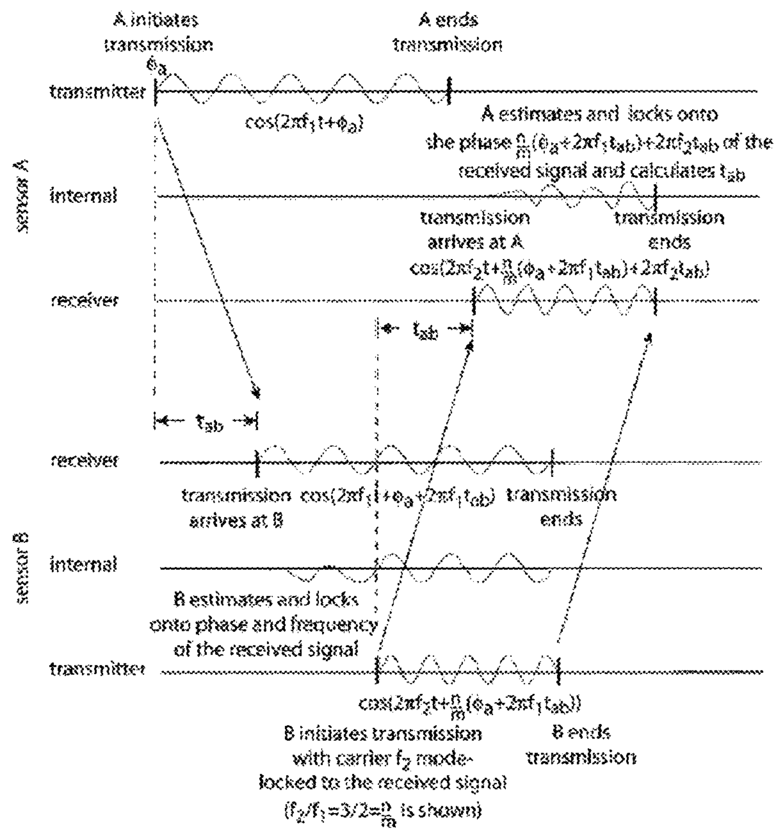
FIGS. 3 and 4 represent the signals measured at different points of the system.

Its principle, summarized in FIG. 3, is as follows: here we have two sensors A and B. Sensor A transmits a sinusoidal signal at frequency $f_1$. This signal is received by sensor B with a delay $t_{AB}$. Sensor B then locks onto the frequency and phase of the signal and, due to a PLL, generates a signal with the same phase shift, but of frequency $f_2$ proportional to $f_1$, and then transmits it. This signal may have a delay due to the processing electronics. This new signal is received by sensor A with a delay $t_{AB}$ that is added to the phase shift already present. Sensor A then locks onto the frequency and phase and can compare the phase of the signal that it transmitted with that of the one onto which it is locked: the phase shift and therefore the distance are thus retrieved.

Once the phase shift has been retrieved, it must be measured in order to find the distance datum. The method used to measure the phase shift is given as an indication.

Figure 4:
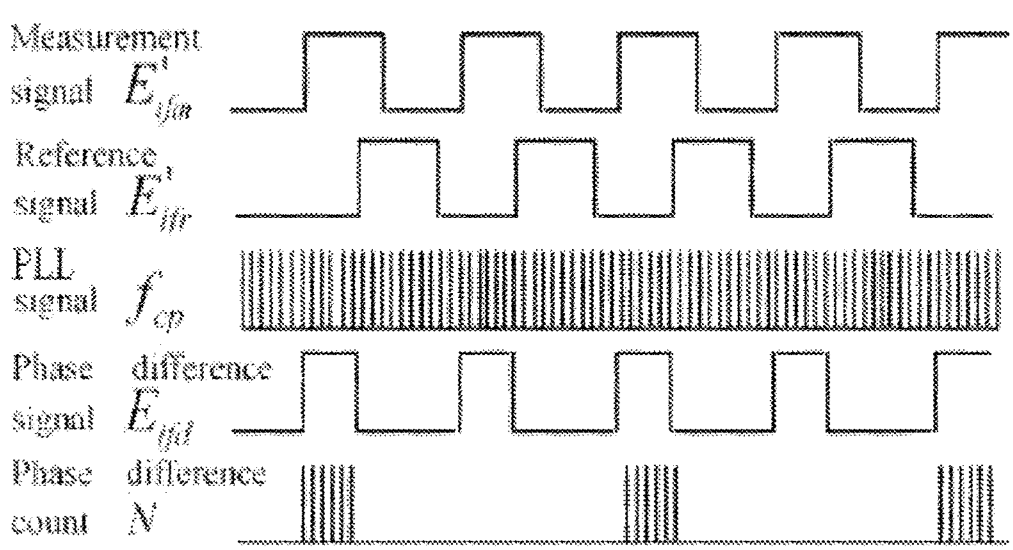

The method described is based on a clock rising edge counter. The principle of this method is illustrated in FIG. 4. The signal emitted by the system is shown in this Figure as $E'_{ifm}$ and the signal reflected and received by the system is shown as $E'_{ifr}$. It will be noted that these two signals are phase-shifted and that the corresponding phase difference signal is shown as $E_{ifd}$. A clock of frequency $f_{cp}$ significantly higher than the frequency of the emitted signal is then used in an AND logic gate with the signal $E_{ifd}$ in order to obtain the signal shown on the last line. By counting the number of rising edges of this signal, it is thus possible to measure the width of each high state of the signal $Ei_{fd}$ and thus to measure the phase shift value.

This approach, however, introduces a compromise: the higher the frequency of the signal emitted, the better the theoretical resolution of the distance measurement. However, for a fixed $f_{cp}$ frequency, the higher the frequency of the signal emitted, the poorer the resolution of the phase shift measurement by the clock rising edge counter. In order to overcome this problem, a conventional technique involves emitting the signal at a high frequency then transposing the echo received to a lower frequency before processing it, according to the principle of heterodyne processing based on the multiplication of several frequencies combined by a mixer.

Taking the Calculation Time into Account

The processing carried out in order to calculate the distance can take into account, in order to improve the relevance of the calculation, the delay introduced by the processing circuit (12) by de-noising the signal received by the sensor of the followed vehicle, in order to control the signal emitted by the followed vehicle.

This delay can be taken into account in the form of a fixed parameter taken into account in order to calculate the distance. This fixed parameter is determined experimentally or by modeling based on the nominal processing time of the processing circuit (12).

It can also be formed by a variable parameter that can be periodically updated, for example in the event of a change in the processing technologies on the vehicles.

It can also be updated by learning based on other data on the remote measurement of the distance between the following vehicle and the followed vehicle available on the following vehicle, for example geo-tracking data of both vehicles received by the following vehicle, or data coming from other telemetry equipment, for example systems using a laser or sound source.

Variations for Encoding the Signal

The signal controlling the light source of one and/or the other vehicle can also form the object of an encoding to transmit information such as vehicle speed, or an identity or braking information or possibly the date and time, or even information relating to distance, by clock comparison.

This encoding can be a Manchester type encoding, also call biphase encoding or PE (Phase Encoding), introducing a transition in the middle of each interval. It involves implementing an exclusive OR (XOR) between the signal and the clock signal, which translates into a rising edge if the bit is zero and a falling edge if it is not.

It can also be an "encoding of pairs of four-bit values into pairs of six-bit symbols" type encoding, as described for example in European patent EP0629067.

Such a type of encoding is fundamentally different from a pseudo-random encoding described in EP0961134.

The encoded information can for example include information on the activation of braking or acceleration by a vehicle, during platooning, in order to disseminate this information to the other following vehicles.

Variations for Measuring the Lateral Distance

The example of implementation described allows distance in the longitudinal direction to be provided, on the right between the optoelectronic assembly equipping the following vehicle and the optoelectronic assembly equipping the followed vehicle.

It is possible to provide additional information concerning the lateral offset of the two vehicles, for example in order to provide information on preparation for overtaking or switching to another traffic lane.

According to this variation, different combinations can be envisaged:

a) The following vehicle can comprise an optoelectronic assembly formed by one light source $SL_s$ and two photosensitive sensors $CP_s$, arranged for example on either side at the front of the vehicle, while the followed vehicle, constituting the target, comprises an optoelectronic assembly formed by at least one light source $SL_c$ and one photosensitive sensor $CP_c$ spaced apart.

b) The following vehicle can comprise an optoelectronic assembly formed by two offset light sources $SL_s$, for example on either side at the front of the vehicle, and two photosensitive sensors $CP_s$, while the followed vehicle comprises an optoelectronic assembly formed by two light sources $SL_c$ and two photosensitive sensors $CP_c$ spaced apart, for example arranged on either side at the back of the vehicle.

In this case, each of the light sources SL of the following vehicle and the source located on the same side on the followed vehicle is modulated with a specific frequency F.

The invention claimed is:

1. An optical telemetry system for measuring the distance between a following vehicle and a followed vehicle; the system comprising:

a first optoelectronic assembly formed by at least one first light source $SL_s$ and at least one first photosensitive sensor $CP_s$, wherein said at least one first source and at least one first photosensitive sensor are oriented in a first direction of the following vehicle, and a second optoelectronic assembly formed by at least one second light source $SL_c$ and at least one second photosensitive sensor $CP_c$ oriented in the opposite direction of the followed vehicle, wherein said at least one first and second light sources $SL_s$ and $SL_c$ are conventional light sources, the at least one first light source $SL_s$ being modulated by a signal of frequency $F_s$, said at least one second light source $SL_c$ of the followed vehicle being modulated by a clock of a frequency controlled by a phase-locked loop driven by the electrical signal delivered by said at least one second photosensitive sensor $CP_c$, said first optoelectronic assembly further comprising a circuit for measuring the phase shift between the electrical signal delivered by said at least one first photosensitive sensor $CP_s$ and the signal modulating the paired at least one first light source $SL_s$, said system further comprising a computer for determining the distance depending on the frequency $F_s$ and the measured phase shift.

2. The optical telemetry system according to claim 1, wherein said at least one first light source $SL_s$ of the first optoelectronic assembly is directed towards a front of the following vehicle and is formed by LED lamps of a vehicle emitting a white light.

3. The optical telemetry system according to claim 1, wherein said at least one second light source $SL_c$ of the second optoelectronic assembly is directed towards a rear of the followed vehicle and is formed by a signaling lamp of a vehicle emitting a colored light.

4. The optical telemetry system according to claim 1, wherein the modulation signal is a square-wave signal.

5. The optical telemetry system according to claim 1, wherein the modulation signal is a sinusoidal signal.

6. The optical telemetry system according to claim 1, wherein at least one of the optoelectronic assemblies comprises a circuit for processing the signal in order to reconstruct a signal corresponding to the nominal form based on a light signal received by the at least one first or second photosensitive sensor.

7. The optical telemetry system according to claim 1, wherein the phase-shift measurement is performed by a heterodyne circuit.

8. The optical telemetry system according to claim 1, wherein the optoelectronic assemblies comprise an opaque cover preventing direct transmission between the at least one light source and the at least one photosensitive sensor.

9. The optical telemetry system according to claim 1, wherein said at least one second light source $SL_c$ of the followed vehicle is modulated by a clock of frequency $F_c$, one of the frequencies $F_s$, $F_c$ being a multiple of the other, the first optoelectronic assembly comprising a circuit for filtering the signal delivered by the at least one first photosensitive sensor $CP_s$ by a filter reducing the amplitude of the signals of frequency $F_s$.

10. The optical telemetry system according to claim 1, wherein at least one of said optoelectronic assemblies comprises a circuit for encoding the modulated signal.

11. The optical telemetry system according to claim 1, wherein the first optoelectronic assembly directed towards in front of the following vehicle is formed by one first light source $SL_s$ and two first photosensitive sensors $CP_s$ arranged on either side at the back of the vehicle, and in that the optoelectronic assembly directed towards behind is formed by at least one second light source $SL_c$ and one second photosensitive sensor $CP_c$.

12. The optical telemetry system according to claim 1, wherein the first optoelectronic assembly formed by two first light sources $SL_s$ and two first photosensitive sensors $CP_s$ on either side at the front of the following vehicle, each of the light sources SL of the following vehicle being modulated with a specific frequency F, as well as a second optoelectronic assembly directed towards the rear, formed by two second light sources $SL_c$ on either side at the back of the followed vehicle and at least one second photosensitive sensor $CP_c$, each of the light sources SL of the followed vehicle being modulated with a specific frequency F.

13. The optical telemetry system according to claim 12, wherein the second optoelectronic assembly comprises two second photosensitive sensors $CP_c$ arranged on either side at the back of the followed vehicle.

14. The optoelectronic assembly for an optical telemetry system according to claim 1, wherein the system comprises at least one first light source $SL_s$ modulated by a signal of frequency $F_s$, and at least one first photosensitive sensor $CP_s$ as well as a circuit for measuring the phase shift between the electrical signal delivered by said at least one first photosensitive sensor $CP_s$ and the signal modulating the paired at least one first light source $SL_s$, said system further comprising a computer for determining the distance depending on the frequency F and the measured phase shift.

15. The optoelectronic assembly for an optical telemetry system according to claim 1, wherein the system comprises at least one second light source $SL_c$ and at least one second photosensitive sensor $CP_c$, said at least one second light source $SL_c$ of the followed vehicle being modulated by a clock of frequency controlled by a phase-locked loop driven by the electrical signal delivered by said at least one photosensitive sensor $CP_c$.

16. A method for measuring the distance between two vehicles wherein the front of each vehicle is equipped with a first optoelectronic assembly formed by at least one first light source $SL_s$ and at least one first photosensitive sensor $CP_s$ oriented towards in front of the vehicle, and in that the back of each vehicle is equipped with a second optoelectronic assembly formed by at least one second light source $SL_c$ and at least one second photosensitive sensor $CP_c$ oriented towards behind the vehicle, said at least one first and second light sources $SL_s$ and $SL_c$ being conventional light sources, the at least one first light source $SL_s$ being modulated by a signal of frequency $F_s$, said at least one second light source $SL_c$ of a followed vehicle being modulated by a clock of frequency controlled by a phase-locked loop driven by the electrical signal delivered by said at least one photosensitive sensor $CP_c$, said first optoelectronic assembly further comprising a circuit for measuring the phase shift between the electrical signal delivered by said at least one second photosensitive sensor $CP_c$ and the signal modulating the paired at least one second light source $SL_c$, said system further comprising a computer for determining the distance depending on the frequency $F_s$ and the measured phase shift.

17. A motor vehicle comprising an optical telemetry system for measuring the distance separating said vehicle from a second vehicle, wherein:

a first end of said vehicle comprises a first optoelectronic assembly formed by at least one first light source $SL_s$ and at least one first photosensitive sensor $CP_s$, oriented in the direction for measuring a third-party vehicle, and a second, opposite, end of said vehicle comprises a second optoelectronic assembly formed by at least one second light source $SL_c$ and at least one second photosensitive sensor $CP_c$ oriented in the direction for measurement by the second vehicle, wherein said first and second light sources $SL_s$ and $SL_c$ are conventional light sources, the first light source $SL_s$ being modulated by a signal of frequency $F_s$, said second light source $SL_c$ of the second vehicle being modulated by a clock of a frequency controlled by a phase-locked loop driven by the electrical signal delivered by said second photosensitive sensor $CP_c$, said first optoelectronic assembly furthermore comprising a circuit for measuring the phase shift between the electrical signal delivered by said photosensitive sensor $CP_s$ and the signal modulating the paired light source $SL_s$, said system furthermore comprising a computer for determining the distance depending on the frequency $F_s$ and the measured phase shift.

18. The motor vehicle according to claim 17, wherein said first end of the vehicle is the front of the vehicle and the second end of the vehicle is the back of the vehicle, the distance being calculated by said vehicle, in relation to the distance separating it from the second vehicle.

19. The motor vehicle according to claim 18, wherein one of said light sources SL is formed by at least one of the vehicle lamps.

20. The motor vehicle according to claim 18, wherein one of said light sources SL is formed by at least one of the vehicle signaling lamps.

21. A motor vehicle comprising an optical telemetry system for measuring the distance separating the motor vehicle from a second vehicle, wherein said vehicle is a followed vehicle and said second vehicle is a following vehicle, said followed vehicle comprising a first, back, end and a second, front, end, said optical telemetry system of the followed vehicle calculating the distance in relation to the distance separating the followed vehicle from the following vehicle;

the telemetry system comprising:

a first optoelectronic assembly formed by at least one first light source $SL_s$ and at least one first photosensitive sensor $CP_s$, wherein said at least one first source and at least one first photosensitive sensor are oriented in a first direction of the following vehicle, and a second optoelectronic assembly formed by at least one second light source $SL_c$ and at least one second photosensitive sensor $CP_c$ oriented in the opposite direction of the followed vehicle, wherein said at least one first and second light sources $SL_s$ and $SL_c$ are conventional light sources, the at least one first light source $SL_s$ being modulated by a signal of frequency $F_s$, said at least one second light source $SL_c$ of the followed vehicle being modulated by a clock of a frequency controlled by a phase-locked loop driven by the electrical signal delivered by said at least one second photosensitive sensor $CP_c$, said first optoelectronic assembly further comprising a circuit for measuring the phase shift between the electrical signal delivered by said at least one first photosensitive sensor $CP_s$ and the signal modulating the paired at least one first light source $SL_s$, said system further comprising a computer for determining the distance depending on the frequency $F_s$ and the measured phase shift.

* * * * *